(12) United States Patent
Voegeli et al.

(10) Patent No.: US 10,014,792 B2
(45) Date of Patent: Jul. 3, 2018

(54) MULTI-PHASE ELECTRIC DRIVE AND POWER UNIT THEREOF FOR USE WITH A MULTI-PHASE AC LOAD

(71) Applicant: ABB Schweiz AG, Baden (CH)

(72) Inventors: Andreas Voegeli, Doettingen (CH); Jukka Palomaki, Beijing (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/157,053

(22) Filed: May 17, 2016

(65) Prior Publication Data

US 2016/0322913 A1 Nov. 3, 2016

Related U.S. Application Data

(63) Continuation of application No. PCT/EP2014/059652, filed on May 12, 2014.

(30) Foreign Application Priority Data

Dec. 19, 2013 (CN) .......................... 2013 1 0706158

(51) Int. Cl.
*H02M 5/458* (2006.01)
*H02M 1/16* (2006.01)
(Continued)

(52) U.S. Cl.
CPC .............. *H02M 5/458* (2013.01); *H02M 1/12* (2013.01); *H02M 1/14* (2013.01); *H02M 1/16* (2013.01);
(Continued)

(58) Field of Classification Search
CPC .................................................. H02M 5/458
See application file for complete search history.

(56) References Cited

U.S. PATENT DOCUMENTS 6,301,130 B1 10/2001 Aiello et al.
2007/0291522 A1 12/2007 Toba et al.
(Continued)

FOREIGN PATENT DOCUMENTS

CN 1969437 A 5/2007
JP 7225179 A 10/1995
(Continued)

OTHER PUBLICATIONS

International Search Report and Written Opinion, PCT/EP2014/059652, ABB Technology Ltd., dated Jun. 3, 2015.
(Continued)

*Primary Examiner* — Kyle J Moody
*Assistant Examiner* — Trinh Q Dang
(74) *Attorney, Agent, or Firm* — Taft Stettinius & Hollister LLP

(57) ABSTRACT

It is provided a multi-phase electric drive for use with a multi-phase AC load and the power unit thereof. The multi-phase electric drive includes a multi-phase power transformer with at least one primary winding and a plurality of secondary windings. The primary winding may be electrically connected to a source of multi-phase AC power. Power units may have an input connected with a corresponding one of said plurality of secondary windings and may have a single-phase controllable output to such multi-phase AC load. The power units may be serially connected with respective others of said power units in each phase output line and are connectable to said multi-phase AC load.

18 Claims, 5 Drawing Sheets

(51) Int. Cl.
*H02M 5/46* (2006.01)
*H02M 5/00* (2006.01)
*H02M 7/49* (2007.01)
*H02M 1/12* (2006.01)
*H02M 1/14* (2006.01)

(52) U.S. Cl.
CPC ............... *H02M 5/00* (2013.01); *H02M 5/46* (2013.01); *H02M 7/49* (2013.01)

(56) References Cited

U.S. PATENT DOCUMENTS

2010/0073970 A1\* 3/2010 Abolhassani ........... H01F 30/12
363/37
2012/0033472 A1\* 2/2012 Oka ....................... H02P 13/00
363/127
2014/0085835 A1\* 3/2014 Berry ....................... H01G 2/16
361/748

FOREIGN PATENT DOCUMENTS

JP          879963 A    3/1996
KR   1020090113625 A   11/2009

OTHER PUBLICATIONS

The State Intellectual Property Office of the P.R. of China, Office Action for corresponding application 201310706158.6, dated Jul. 19, 2017, 21 pages, including English translation.

\* cited by examiner

MULTI-PHASE ELECTRIC DRIVE AND POWER UNIT THEREOF FOR USE WITH A MULTI-PHASE AC LOAD

TECHNICAL FIELD

The invention relates to the field of multi-phase electric drive, and more particularly to multi-phase electric drive with capacitor bank voltage monitoring and the method thereof.

BACKGROUND ART

Cascaded multi-phase electric drives are used in industry to provide variable electric power to AC motors. These same drives can be used in other applications not related to specifically to motors but where a variable-output voltage or frequency is desired. Typical drives have an AC input power source and some type of conversion apparatus, usually using solid-state devices, for converting the fixed AC input voltage into a variable-voltage and/or variable-frequency output. One such type of drive is described in U.S. Pat. No. 5,625,545, which is incorporated herein by reference. That patent describes a power supply used as a drive which utilizes a number of power cells (power units) arranged to produce a three-phase AC output. Such multiple power units in series can be utilized to provide higher voltage outputs than would be available with only a single power unit. In the power cell, the DC currents of the rectifier generally will match the DC current of the output converter, but the instantaneous ripple currents generally will not match. It is preferred to provide smoothing capacitors, which can act as a current smoothing filter, to carry the difference ripple current. Capacitors are representative of a capacitor bank, the precise values of which may depend upon the power requirements of the inductive load.

The DC capacitor bank of power cells using intermediate voltages, for example, above 400 V, often use two or three electrolytic capacitors in series. If two level inverter topologies are used, the voltages of the intermediate potentials between those capacitors are not measured.

When electrolytic capacitors are overstressed they can become thermally unstable, which can cause violent explosions driven by evaporated liquid electrolyte. Such explosions must be avoided due to safety and secondary damage. Monitoring the overall voltage of the series connected capacitors is not sufficient since unequal parameters of the individual capacitors due to aging or defects can cause excessively unequal voltage sharing among the series connected capacitors.

Therefore, monitoring the voltage of the individual capacitor among the series is highly desired.

BRIEF SUMMARY OF THE INVENTION

It is therefore an objective of the invention to a multi-phase electric drive for use with a multi-phase AC load, including: a multi-phase power transformer, including at least one primary winding and a plurality of secondary windings, said primary winding being electrically connectable to a source of multi-phase AC power; a multiple of power units, each of said first number of power units having an input connected with a corresponding one of said plurality of secondary windings, each of said plurality of power units having a single-phase controllable output to such multi-phase AC load, and said plurality of power units being serially connected to with respective others of said power units in each phase output line connectable to said multi-phase AC load; said power unit each includes: a rectifier, being adapted for converting incoming power from the corresponding secondary windings into a DC voltage; and a capacitor bank, being connected to an output of said rectifier through DC+ and DC−; wherein: said capacitor bank includes a plurality of capacitor sets connected in series; and each of said capacitor sets includes one capacitor or a multiple of capacitor elements connected in parallel; a voltage measurement device, being adapted for measuring respective voltages, as regards to a potential at one of DC+ and DC− of the capacitor bank, at the other of DC+ and DC− and connection points among the capacitor sets connected in series; and a control system, being adapted for controlling said plurality of power units based on the measured voltage between DC+ and DC− of the capacitor bank and monitoring a fault on said plurality of capacitor sets based on the measured respective voltages.

According to another aspect of the invention, it is provided a power unit used in a multi-phase electric drive, including: a rectifier, being adapted for converting incoming power from the corresponding secondary windings into a DC voltage; and a capacitor bank, being connected to an output of said rectifier through DC+ and DC−; wherein: said capacitor bank includes a plurality of capacitor sets connected in series; and each of said capacitor sets includes one capacitor or a multiple of capacitor elements connected in parallel; a voltage measurement device, being adapted for measuring respective voltages, as regards to a potential at one of DC+ and DC− of the capacitor bank, at the other of DC+ and DC− and connection points among the capacitor sets connected in series; and a control system, being adapted for controlling said plurality of power units based on the measured voltage between DC+ and DC− of the capacitor bank and monitoring a fault on said plurality of capacitor sets based on the measured respective voltages.

By having such capacitor bank voltage monitoring system, the capacitors can be protected for avoidance of over-voltage across each capacitor.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
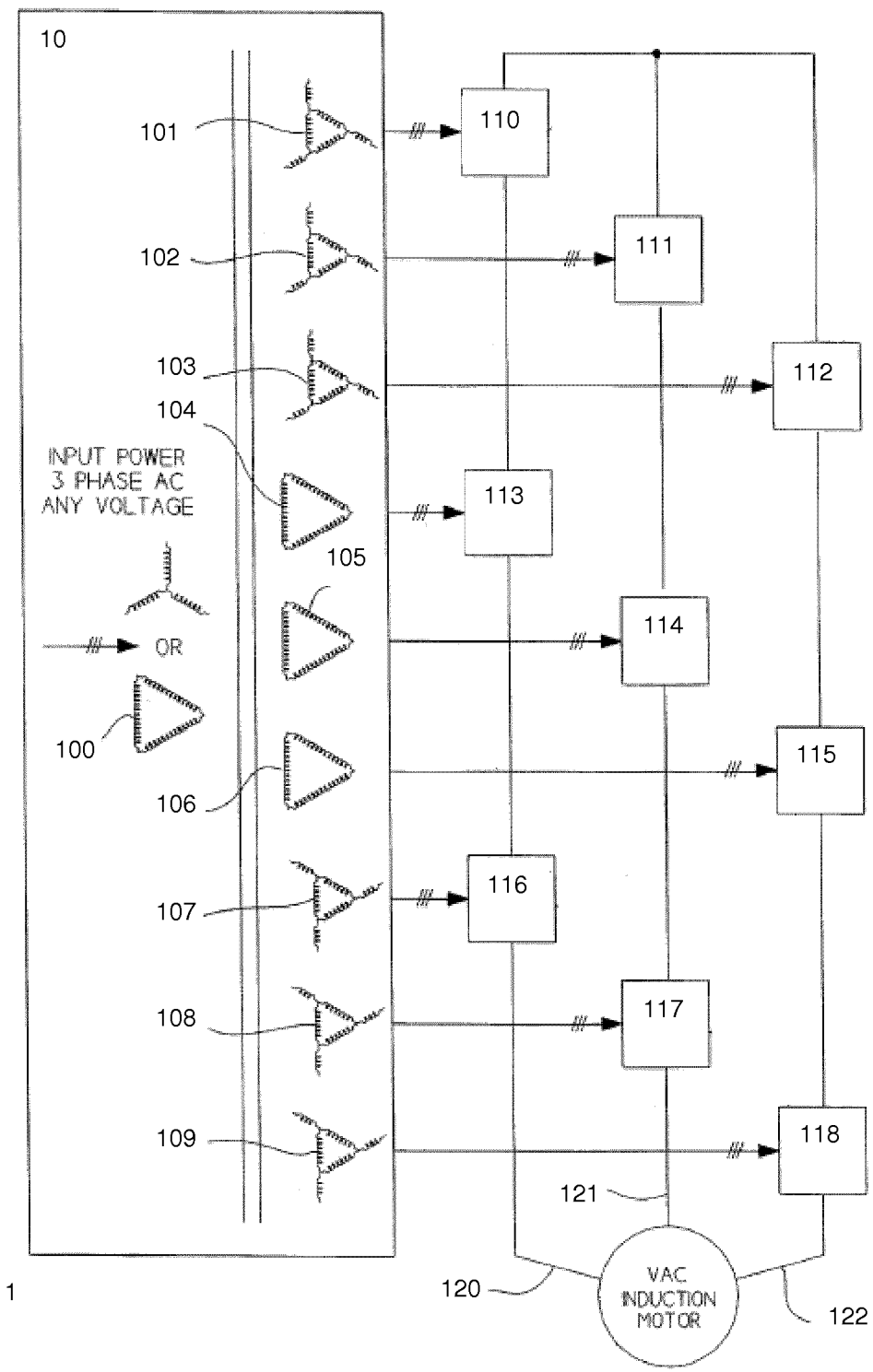
FIG. 1 shows a power circuit diagram for a cascaded multi-phase electric drive having three power units in each phase.

FIG. 1 shows a power circuit diagram for a cascaded multi-phase electric drive having three power units in each phase. As shown in FIG. 1, three-phase AC power is inputted to primary winding 100 of power supply transformer 10 of a cascaded multi-phase drive 1. Primary winding 100, which may be star- or mesh-connected, energizes three-phase secondary windings 101 through 109. The three-phase power associated with each of secondary windings 101 through 109 can be supplied to power units 110 through 118, respectively. In this present embodiment it is preferred to provide mesh-connected secondary windings 101 through 109 to lower the supply transformers K-factor and to improve harmonics control. Mesh-connected winding may include, for example, delta or extended delta configurations. Under certain circumstances, such mesh windings may be manipulated to advance some of the secondary windings by preselected degrees of electrical phase, to retard other secondary windings by preselected degrees of electrical phase, and, perhaps, to leave other secondary windings substantially un-shifted in phase.

In the present embodiment shown in FIG. 1, it is described that one-third of the secondary windings be advanced in phase by 20 (degree) and that one-third of the secondary windings be delayed in phase by 20 (degree). The remaining third of the secondary windings remain un-shifted. In the embodiment of FIG. 1, the phase-shifted windings use extended-delta-configured windings, and the un-shifted windings use delta-configured windings. For other voltages, the respective phase shift needed can be obtained by dividing 60 (degree) by the number of power units per phase. For example, with 5 power units per phase, the shifts are +24 (degree), +12 (degree), 0 (degree), −12 (degree) and −24 (degree); with 6 power units per phase, the shifts are +25 (degree), +15 (degree), +5 (degree), −5 (degree), −15 (degree) and −25 (degree); with 8 power units per phase, the shifts are +18.75 (degree), +11.25 (degree), +3.75 (degree), −3.75 (degree), −11.25 (degree) and −18.75 (degree). It is preferred to connect multiple power units to each of phase output lines 120, 121, 122, which can represent phase A, Phase B and Phase C, respectively. Multiple power units can be connected in series on each phase output line, making it possible to produce a medium-voltage input phase line controller with a plurality of low-voltage power units. Serial connections also make multiple voltage states per phase possible; these multiple voltage states per phase may be used to obtain improved current waveforms. Each power unit may be constructed internally to low-voltage standards, for example, each power unit may have a 1000-volts rating, despite its inclusion in a medium-voltage apparatus. In such an embodiment, the individual power units may be isolated from ground, and other power units, using insulation suitable for the medium voltage level being used.

Figure 2A:
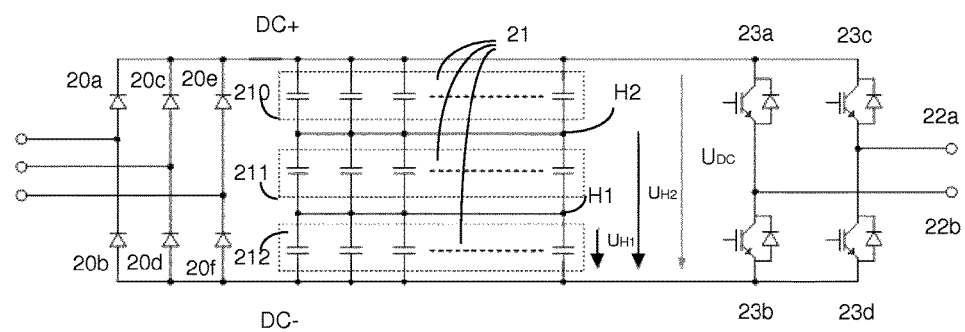
FIG. 2A shows a typical power unit as shown in FIG. 1.

FIG. 2A shows a typical power unit as shown in FIG. 1. However, it is to be understood that other power units can be utilized in practicing this invention. The power unit shown in FIG. 2A is similar to that shown in U.S. Pat. No. 5,625,545. As show in FIG. 2A, each of power units 110 through 118 is a power converter which converts the three-phase incoming power into a DC component through utilization of a rectifier composed of diodes 20a-20f. The output of this rectifier is then output to capacitor bank 21 through a first terminal DC+ and a second terminal DC−, which can provide storage and smoothing of the DC output. The capacitor bank, for example, includes a plurality of capacitor sets 210, 211, 212 connected in series with connection points H1, H2 between each other, and the capacitor set 210 includes a multiple of capacitors connected in parallel, the capacitor set 211 includes a multiple of capacitors connected in parallel, the capacitor set 212 includes a multiple of capacitors connected in parallel. As alternative, it is to be understood that the number of capacitor set may be selectable to be 4, 5, 6, and so on according to the voltage capability of the capacitor set and the DC-link voltage of the power unit; and the number of capacitor in each capacitor set may selectable to be 1, 2, 3, and so on according to the current capability of the capacitor and the DC-link current of the power unit. For example, the number of the capacitor sets can be selected according to the algorithm as:

$$N_{capacitor\ set} = V_{DC}/N_{rated\ voltage}$$

Wherein: $N_{capacitor\ set}$ represents the number of the capacitor sets, $V_{DC}$ represents the voltage across the first terminal DC+ and the second terminal DC−, and $V_{rated\ voltage}$ represents the rated voltage of the capacitor.

The number of capacitor per capacitor set can be selected according to the algorithm as:

$$N_{capacitor\ per\ set} = I_{ripple\ current\ bank}/I_{capacitor\ ripple\ current\ capacity}$$

Wherein: $N_{capacitor\ per\ set}$ represents the number of capacitor per capacitor set, $I_{ripple\ current\ bank}$ represents the total ripple current of the capacitor bank, and $I_{capacitor\ ripple\ current\ capacity}$ represents capacitor ripple current capability.

The DC power in the converter can be selectively applied to the power unit outputs 22a and 22b using a pulse-width modulated (PWM) method under the control of control system at least based on the amplitude of the voltage across the capacitor bank. The pulse-width modulation may be implemented using a bridge converter which is composed of semiconductor switches such as 23a-23d. Any type of acceptable switch element can be used; and depending on the power level, various solid-state components may be chosen. As shown, the converter output utilizes four IGBTs. In such a pulse-width modulated operation the switches can be considered either fully on or fully off as they operate. As will be understood in most applications, it is desirable that the power units utilized in a cascaded arrangement be similar and constructed in a form so as to limit the number of subassemblies and permit power units to be interchangeable within the same drive. Power unit 110 through 118 as shown in FIG. 2A could be utilized for all of the power units in FIG. 1.

Figure 2B:
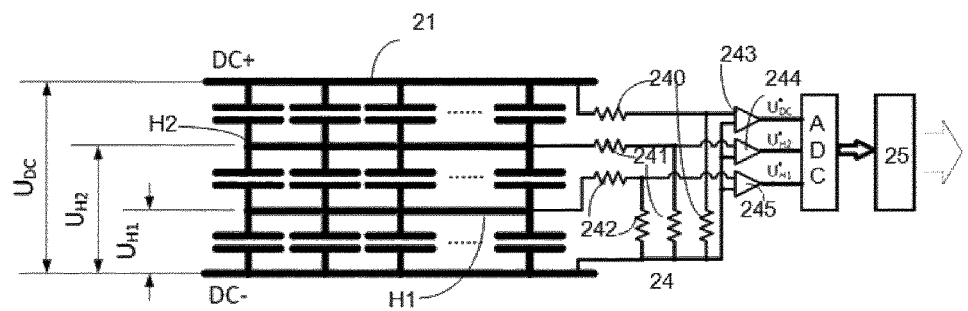
FIG. 2B shows a voltage measurement device for measuring voltages across the capacitor sets of the capacitor bank 21 according to FIG. 2A.

FIG. 2B shows a voltage measurement device for measuring voltages across the capacitor sets of the capacitor bank 21 according to FIG. 2A. As part of the power unit shown in FIG. 2A is a voltage measurement device 24. For example, the voltage measurement device 24 can include three voltage dividers 240, 241, 242; and the control system 25 includes three comparators 243, 244, 245. The voltage divider 240 is electrically connected between DC+ and DC− for dividing voltage DC+ to DC− and outputs the divided voltage to the comparator 243, and the comparator 243 compares the voltage output from the voltage divider 240 with potential DC− and output the comparison result $U'_{DC}$ to a control system 25 via analogue to digit conversion (ADC); the voltage divider 241 is electrically connected between connection point H2 and DC− for dividing voltage H2 to DC− and outputs the divided voltage to the comparator 244, and the comparator 244 compares the voltage output from the voltage divider 241 with potential DC− and output the comparison result $U'_{H2}$ to a control system 25 via analogue to digit conversion; similarly, the voltage divider 242 is electrically connected between connection point H1 and DC− for dividing voltage H1 to DC− and outputs the divided voltage to the comparator 245, and the comparator 245 compares the voltage output from the voltage divider 242 with potential DC− and output the comparison result U'$_{H1}$ to a control system 25 via analogue to digit conversion. It is to be understood that the voltage division ratios for the voltage dividers 240, 241, 242 can be selected and predetermined.

Referring to FIG. 2B, the control system 25 receives the signals representing the magnitudes of the measured voltages, and control system 25 can calculate the magnitudes of the voltages U$_{DC}$, U$_{H2}$, and U$_{H1}$ based on the predetermined voltage division ratios of the voltage dividers 240, 241, 242 and the magnitudes of the measured voltages U'$_{DC}$, U'$_{H2}$, and U'$_{H1}$.

Based on these signals, the control system 25 calculates magnitudes of voltages across each of the capacitor sets 210, 211, 212 using the algorithm as:

$$U_{210}=U_{DC}-U_{H2}$$

$$U_{211}=U_{H2}-U_{H1}$$

$$U_{212}=U_{H1}$$

Wherein, U$_{210}$, U$_{211}$, and U$_{212}$ respectively represent magnitudes of voltages across each of the capacitor sets 210, 211, 212.

Figure 2C:
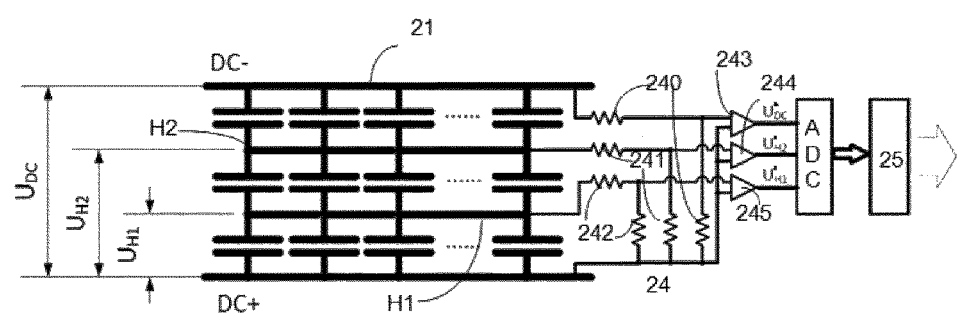
FIG. 2C shows an alternative voltage measurement device for measuring voltages across the capacitor sets of the capacitor bank 21 according to FIG. 2A.

FIG. 2C shows an alternative voltage measurement device for measuring voltages across the capacitor sets of the capacitor bank 21 according to FIG. 2A. The voltage divider 240 is connected between DC+ and DC− for dividing voltage DC− to DC+ and outputs the divided voltage to the comparator 243, and the comparator 243 compares the voltage output from the voltage divider 240 with potential DC+ and output the comparison result U'$_{DC}$ to a control system 25 via analogue to digit conversion; the voltage divider 241 is connected between DC+ and connection point H2 for dividing voltage DC+ to H2 and outputs the divided voltage to the comparator 244, and the comparator 244 compares the voltage output from the voltage divider 241 with potential DC+ and output the comparison result U'$_{H2}$ to a control system 25 via analogue to digit conversion; similarly, the voltage divider 242 is connected between DC+ and connection point H1 for dividing voltage DC+ to H1 and outputs the divided voltage to the comparator 245, and the comparator 245 compares the voltage output from the voltage divider 242 with potential DC+ and output the comparison result U$_{H1}$ to a control system 25 via analogue to digit conversion.

As alternative based on these signals, the control system 25 calculates magnitudes of voltages across each of the capacitor sets 210, 211, 212 using the algorithm as:

$$U_{210}=U_{H2}$$

$$U_{211}=U_{H1}-U_{H2}$$

$$U_{212}=U_{DC}-U_{H1}$$

Wherein, U$_{210}$, U$_{211}$, and U$_{212}$ respectively represent magnitudes of voltages across each of the capacitor sets 210, 211, 212.

Figure 3:
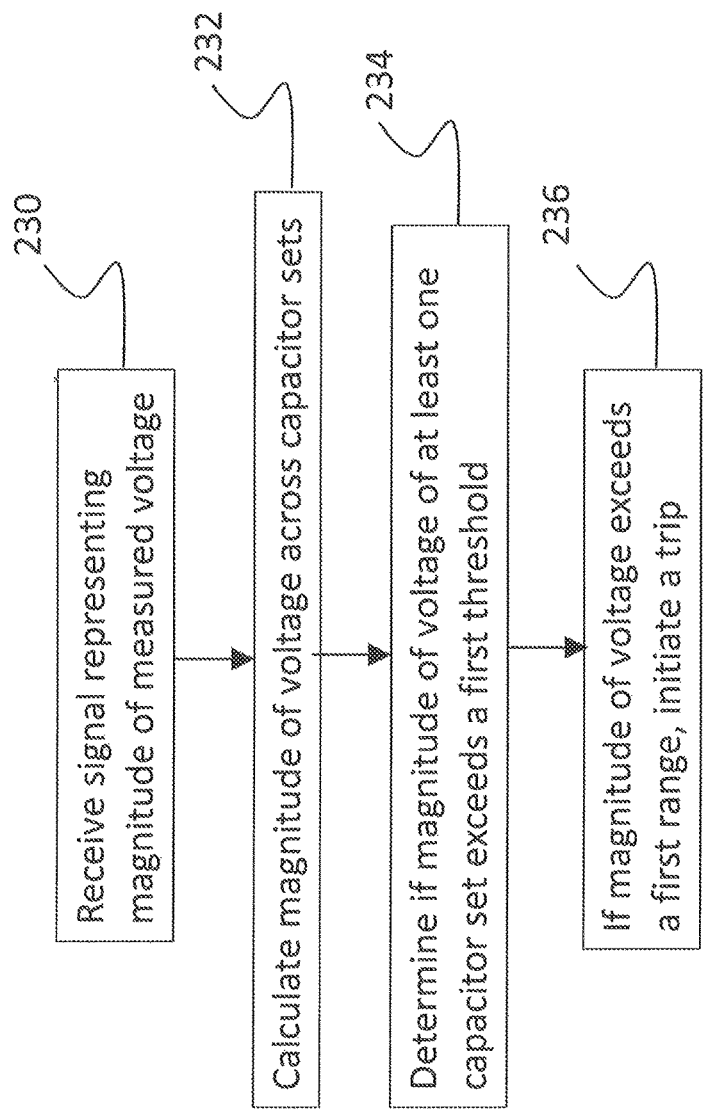
FIG. 3 shows a flowchart for a fault detection process based on voltage magnitudes.

The control system 25 determines a fault on each of the capacitor sets 210, 211, 212 based on the magnitude of voltage across the respective one of the capacitor sets 210, 211, 212 with a first threshold (an embodiment of which can be seen in FIG. 3 which includes blocks 230-236). For example, if U$_{210}$ is larger than the first threshold, then the control system 25 raises an alarm; if a difference between U$_{210}$ and the first threshold exceeds a first range, then the control system 25 can initiate trip signal to stop the operation of the multi-phase electric drive. Because many to factors may contribute to the change of the voltage across the capacitor bank, for example the change of the voltage input to the power unit, the change of the AC load, the switching events of the IGBTs and so on, the voltage across the capacitor set may change accordingly even above the first threshold, but the capacitor set is still in good condition and need not to stop the system; only the level of voltage exceeding the first threshold goes beyond the first range, it can be determined that there is a fault on the capacitor, and thus the system needs to be stopped. By having the first range, it provides a mechanism for differentiating the level of over-voltage of the capacitor set, and thus makes the detection of capacitor fault more accurately.

For example, the algorithm below can be used for detection of capacitor fault:

$$U_{set,n} > U_{threshold,1} \rightarrow \text{Alarm}$$

$$U_{set,n} > U_{threshold,1} + \text{range} \rightarrow \text{Trip}$$

Wherein, U$_{set, n}$ represents the calculated magnitude of the voltage across each capacitor set 210, 211, 212. U$_{threshold,1}$ can be the rated voltage of the capacitor, and the range can be 10% of the surge voltage of the capacitor.

By having such capacitor bank voltage monitoring system, the capacitors can be protected for avoidance of over-voltage across each capacitor.

Figure 4:
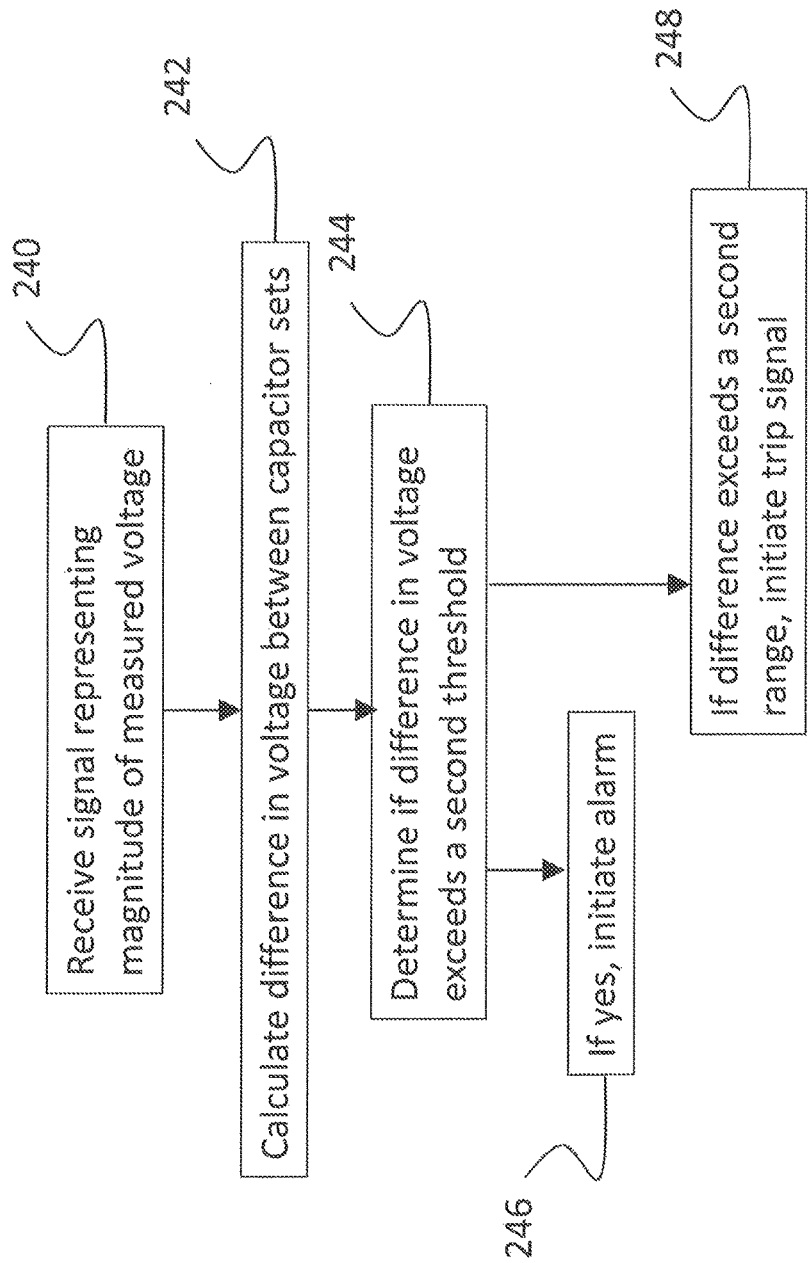
FIG. 4 shows a flowchart for a fault detection process based on voltage unbalance.

As alternative, the control system 25 determines a fault based on unbalance between the voltages across two of the capacitor sets 210, 211, 212 (an embodiment of which can be seen in FIG. 4 which includes blocks 240-248). For example, the control system 25 calculates the difference between U$_{210}$ and U$_{211}$ and/or U$_{211}$ and U$_{212}$. If such difference is larger than a second threshold, then the control system 25 raises an alarm; if a difference exceeds a second range, then the control system 25 can initiate a trip signal to stop the operation of the multi-phase electric drive. Because many factors may contribute to the unbalance of the voltage between the capacitor sets of the capacitor bank, for example the change of the voltage input to the power unit, the change of the AC load, the switching events of the IGBTs and so on, the unbalance of voltage between the capacitor sets may change accordingly even above the second threshold, but the capacitor set is still in good condition and need not to stop the system; only the level of unbalance voltage exceeding the second threshold goes beyond the second range, it can be determined that there is a fault on the capacitor, and thus the system needs to be stopped. By having the second range, it provides a mechanism for differentiating the level of voltage unbalance between the capacitor sets, and thus makes the detection of capacitor fault more accurately.

For example, the algorithm below can be used for detection of voltage unbalance fault between two of the capacitor sets:

$$\left| U_{set,1} - \frac{U_{DC}}{3} \right| \geq U_{threshold,2} \rightarrow \text{Alarm}$$

$$\left| U_{set,2} - \frac{U_{DC}}{3} \right| \geq U_{threshold,2} \rightarrow \text{Alarm}$$

$$\left| U_{set,3} - \frac{U_{DC}}{3} \right| \geq U_{threshold,2} \rightarrow \text{Alarm}$$

$$\left| U_{set,n} - \frac{U_{DC}}{3} \right| \geq U_{threshold,2} + \text{range} \rightarrow \text{Trip}$$

Wherein, U$_{set, n}$ respectively represents the calculated magnitude of the voltage across each capacitor set 210, 211, 212, for example Uset, 1, Uset, 2, Uset, 3 respectively represent the voltage across each capacitor set 210, 211, 212. For example, $U_{threshold,2}$ can be 10% of $U_{DC}/3$, and the range can be can be 10% of $U_{DC}/3$. As an alternative, it is to be understood that the control system 25 is able to calculate the magnitudes of an unbalanced voltage between adjacent capacitor sets, and compare each of the magnitudes of the unbalance voltages to a second threshold. If such difference is larger than the second threshold, then the control system 25 raises an alarm; if the difference exceeds a second range, then the control system 25 can initiate a trip signal to stop the operation of the multi-phase electric drive.

By having such capacitor bank voltage monitoring system, the capacitors can be protected for avoidance of voltage unbalance between two of the capacitor sets.

By having the voltage measurement device monitoring the voltage across the capacitor bank and the voltages across the capacitor sets therein, the fault on the capacitor bank can be monitored based on the measured voltages across the capacitor bank and those across the capacitor sets therein, while the voltage across the capacitor bank can be used for controlling the switching events of the power unit of the multi-phase electric drive.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A multi-phase electric drive for use with a multi-phase AC load, including:
   a multi-phase power transformer, including at least one primary winding and a plurality of secondary windings, said primary winding being electrically connectable to a source of multi-phase AC power;
   a multiple of power units including a first number of power units having an input connected with a corresponding one of said plurality of secondary windings, each of said first number of power units having a single-phase controllable output to such multi-phase AC load, and said first number of power units in a first single phase output line connectable to said multi-phase AC load;
   said power unit each includes:
   a rectifier, being adapted for converting incoming power from the corresponding secondary windings into a DC voltage; and
   a capacitor bank, being connected to an output of said rectifier through DC+ and DC−;
   wherein:
   said capacitor bank includes a plurality of capacitor sets connected in series; and
   each of said capacitor sets includes one capacitor or a multiple of capacitor elements connected in parallel;
   a voltage measurement device, being adapted for measuring respective voltages, as regards to a potential at one of DC+ and DC− of the capacitor bank, at the other of DC+ and DC− and connection points among the capacitor sets connected in series;
   a control system, being adapted for controlling said plurality of power units based on the measured voltage between DC+ and DC− of the capacitor bank and monitoring a fault on said plurality of capacitor sets based on the measured respective voltages; and
   said control system is adapted for calculating a magnitude of voltage across each of said plurality of capacitor sets based on magnitudes of said respective measured voltages, calculating an amplitude of unbalanced voltages among said magnitudes of said voltages across said capacitor sets, and determining said fault based on said calculated magnitude of said unbalanced voltages and a second threshold.

2. The multi-phase electric drive according to claim 1, wherein:
   said voltage measurement device is adapted for measuring respective voltages as regards to said potential of DC−.

3. The multi-phase electric drive according to claim 1, wherein:
   said control system is adapted for determining said fault based on said calculated magnitude and a first threshold.

4. The multi-phase electric drive according to claim 1, wherein:
   said control system has a plurality of power unit controllers integrated respectively with said plurality of power units, being adapted for monitoring said fault on said plurality of capacitor sets.

5. The multi-phase electric drive according to claim 1, wherein:
   said voltage measurement device includes: a multiple of voltage dividers, being arranged to respectively electrically connected between one of the DC+ and DC−, the respective one of the connection points and the other of DC+ and DC−, and for outputting the respective one of the divided voltages; and
   said control system includes: a multiple of comparators, being adapted for respectively comparing the respective one of the divided voltages output from said multiple of voltage dividers.

6. The multi-phase electric drive according to claim 1, wherein: said control system is adapted for raising an alarm if the difference between the calculated magnitude of said unbalanced voltage and said second threshold is within a second range, otherwise initiate a trip signal.

7. The power unit according to claim 1, wherein:
   said multiple of power units further comprising a second number of power units having an input connected with a corresponding one of said plurality of secondary windings, each of said second number of power units having a single-phase controllable output to such multi-phase AC load, and said second number of power units being serially connected with respective others of said second number of power units in a second single phase output line connectable to said multi-phase AC load; and
   said multiple of power units further comprising a third number of power units having an input connected with a corresponding one of said plurality of secondary windings, each of said third number of power units having a single-phase controllable output to such multi-phase AC load, and said third number of power units being serially connected with respective others of said third number of power units in a third single phase output line connectable to said multi-phase AC load.

8. The multi-phase electric drive according to claim 1, wherein:
   said voltage measurement device is adapted for measuring respective voltages as regards to said potential of DC−;

said control system is adapted for determining said fault based on said calculated magnitude and a first threshold;

said control system has a plurality of power unit controllers integrated respectively with said plurality of power units, being adapted for monitoring said fault on said plurality of capacitor sets;

said voltage measurement device includes: a multiple of voltage dividers, being arranged to respectively electrically connected between one of the DC+ and DC−, the respective one of the connection points and the other of DC+ and DC−, and for outputting the respective one of the divided voltages; and said control system includes: a multiple of comparators, being adapted for respectively comparing the respective one of the divided voltages output from said multiple of voltage dividers.

9. The multi-phase electric drive according to claim 3, wherein:

said control system is adapted for raising an alarm if the difference between the calculated magnitude and said first threshold is within a first range, otherwise initiate a trip signal.

10. The multi-phase electric drive according to claim 5, wherein:

said control system is adapted for calculating a magnitude of said voltage across each of said plurality of capacitor sets based on a difference between two of the measured voltages for two of said connection points respectively electrically connected to said capacitor set.

11. The multi-phase electric drive according to claim 8, wherein:

said control system is adapted for calculating said magnitude of said voltage across each of said plurality of capacitor sets based on a difference between two of the measured voltages for two of said connection points respectively electrically connected to said capacitor set;

said control system is adapted for raising an alarm if the difference between the calculated magnitude and said first threshold is within a first range, otherwise initiate a trip signal; and said control system is adapted for raising said alarm if the difference between the calculated magnitude of said unbalanced voltage and said second threshold is within a second range, otherwise initiate a trip signal.

12. A power unit used in a multi-phase electric drive, including:

a rectifier, being adapted for converting incoming power from the corresponding secondary windings into a DC voltage; and a capacitor bank, being connected to an output of said rectifier through DC+ and DC−;

wherein:

said capacitor bank includes a plurality of capacitor sets connected in series; and each of said capacitor sets includes one capacitor or a multiple of capacitor elements connected in parallel;

a voltage measurement device, being adapted for measuring respective voltages, as regards to a potential at one of DC+ and DC− of the capacitor bank, at the other of DC+ and DC− and connection points among the capacitor sets connected in series;

a control system, being adapted for controlling said plurality of power units based on the measured voltage between DC+ and DC− of the capacitor bank and monitoring a fault on said plurality of capacitor sets based on the measured respective voltages; and said control system is adapted for calculating a magnitude of voltage across each of said plurality of capacitor sets based on magnitudes of said respective measured voltages, calculating an amplitude of unbalanced voltages among said magnitudes of said voltages across said capacitor sets, and determining said fault based on said calculated magnitude of said unbalanced voltages and a second threshold.

13. The power unit according to claim 12, wherein:

said voltage measurement device is adapted for measuring respective voltages as regards to said potential of DC−.

14. The power unit according to claim 12, wherein:

said control system is adapted for determining said fault based on said calculated magnitude and a first threshold.

15. The power unit according to claim 12, wherein:

said voltage measurement device includes: a multiple of voltage dividers, being arranged to respectively electrically connected between one of the DC+ and DC−, the respective one of the connection points and the other of DC+ and DC−, and for outputting the respective one of the divided voltages; and said control system includes: a multiple of comparators, being adapted for respectively comparing the respective one of the divided voltages output from said multiple of voltage dividers.

16. The power unit according to claim 13, wherein:

said control system is adapted for raising an alarm if the difference between the calculated magnitude and said first threshold is within a first range, otherwise initiate a trip signal.

17. The power unit according to claim 14, wherein:

said control system is adapted for raising an alarm if the difference between the calculated magnitude of said unbalanced voltage and said second threshold is within a second range, otherwise initiate a trip signal.

18. The power unit according to 15, wherein:

said control system is adapted for calculating a magnitude of said voltage across each of said plurality of capacitor sets based on a difference between two of the measured voltages for two of said connection points respectively electrically connected to said capacitor set.

* * * * *